US006277231B1

(12) United States Patent
Ducruy

(10) Patent No.: US 6,277,231 B1
(45) Date of Patent: Aug. 21, 2001

(54) METHOD FOR PRODUCING A HONEYCOMB CORE IN THERMOFUSIBLE MATERIAL, AND DEVICE FOR IMPLEMENTING SAME

(76) Inventor: Guy Ducruy, Château de Varces, 38760 Varces (FR)

( * ) Notice: Subject to any disclaimer, the term of this patent is extended or adjusted under 35 U.S.C. 154(b) by 0 days.

(21) Appl. No.: 09/381,254

(22) PCT Filed: Mar. 18, 1998

(86) PCT No.: PCT/FR98/00546

§ 371 Date: Nov. 29, 1999

§ 102(e) Date: Nov. 29, 1999

(87) PCT Pub. No.: WO98/41388

PCT Pub. Date: Sep. 24, 1998

(30) Foreign Application Priority Data

Mar. 19, 1997 (FR) .................................................. 97 03572

(51) Int. Cl.[7] ............................ B29C 47/06; B29C 47/88
(52) U.S. Cl. ................................ 156/244.15; 156/244.11; 156/244.21; 156/244.25; 156/244.26; 156/292; 156/500
(58) Field of Search .......................... 156/244.11, 244.13, 156/244.14, 244.15, 244.21, 244.25, 244.26, 285, 292, 500; 264/514, 564, 568, 558; 425/377, 382 R, 465, 376.1

(56) References Cited

U.S. PATENT DOCUMENTS 3,932,106   1/1976   Vogts .

FOREIGN PATENT DOCUMENTS

| 1779330 | 9/1971 | (DE) . |
| 4208812 | 9/1993 | (DE) . |
| 42-024092 | 11/1967 | (JP) . |
| 8700119 | 1/1987 | (WO) . |

Primary Examiner—Michael W. Ball
Assistant Examiner—Barbara J. Musser
(74) Attorney, Agent, or Firm—Cantor Colburn LLP

(57) ABSTRACT

This process consists:

in continuously extruding, with the aid of a multislot die, parallel sheets (31) of thermally fusible material inside a cooling chamber (4), with the creation of a seal between the longitudinal edges of the sheets and the walls of the chamber; and in creating, in this chamber and from the end located on the die side, successively in the various compartments located on both sides of each sheet (31), successively a vacuum and the delivery of a coolant, the two compartments located on the two sides of the same sheet being, in the case of one of them, subjected to a vacuum and, in the case of the other, subjected to the delivery of a coolant, and conversely during the following phase, so as to deform the sheets and weld them in pairs with the formation of cells (36).

17 Claims, 4 Drawing Sheets

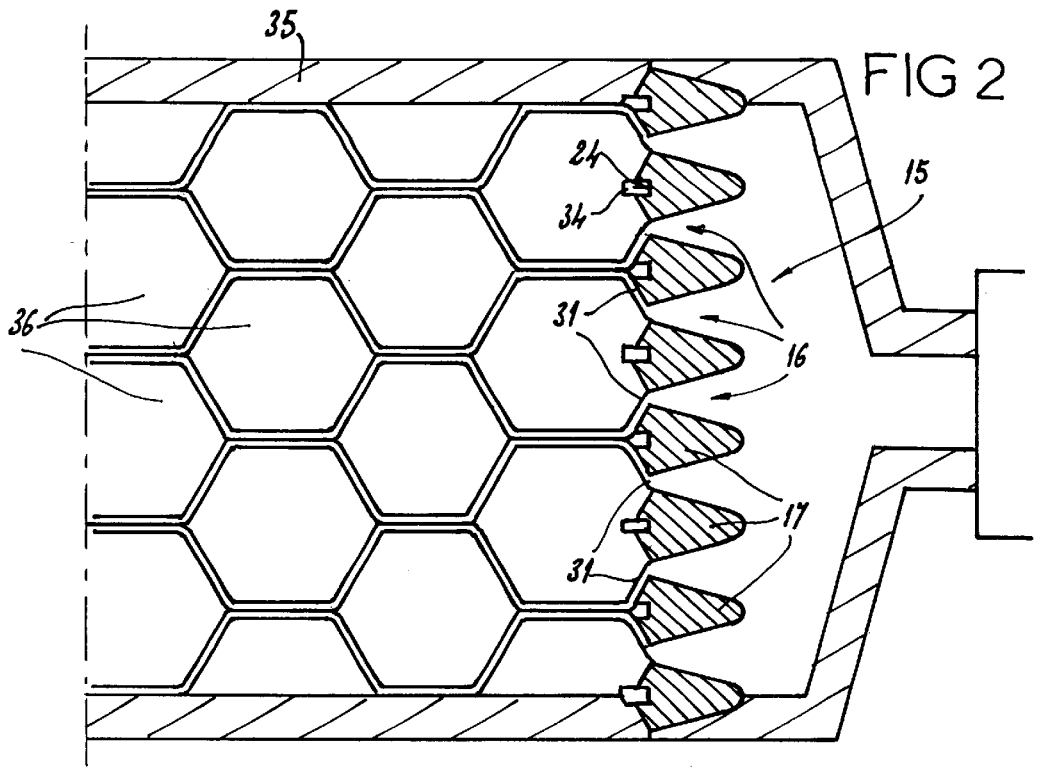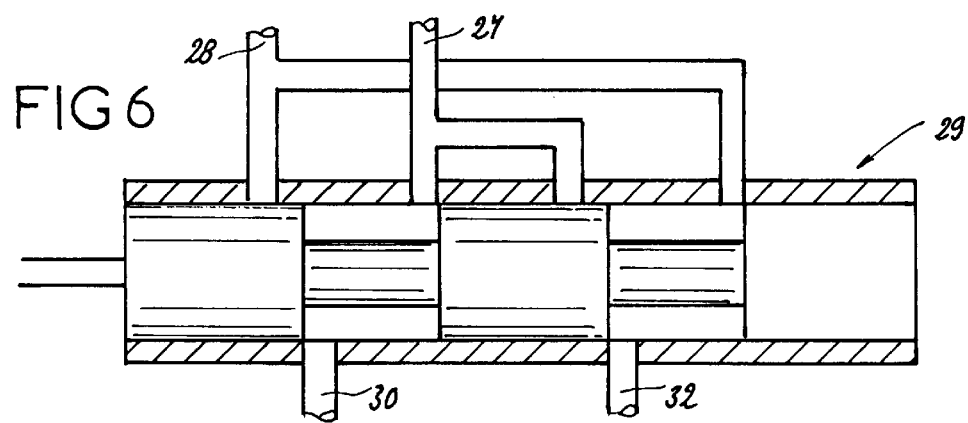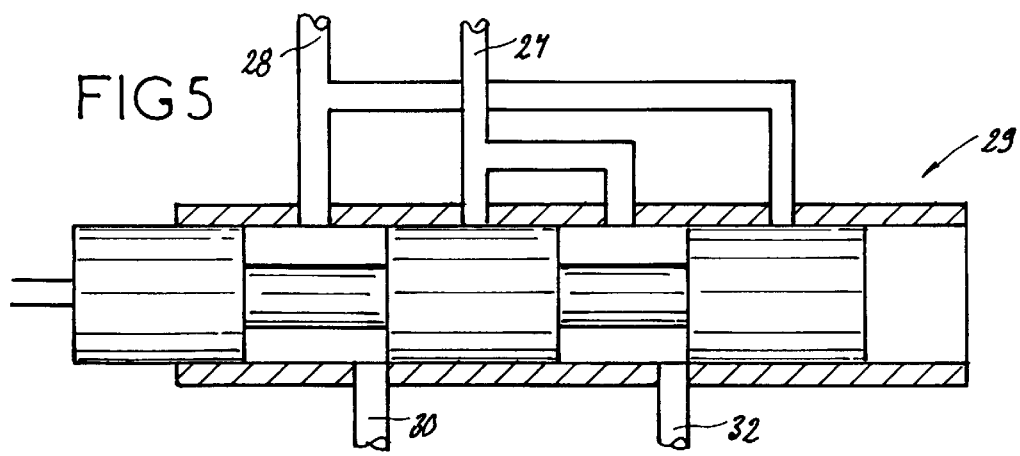

METHOD FOR PRODUCING A HONEYCOMB CORE IN THERMOFUSIBLE MATERIAL, AND DEVICE FOR IMPLEMENTING SAME

The subject of the present invention is a process for manufacturing a honeycomb structure made of thermally fusible material, such as made of thermoplastic or made of rubber, and a plant for the implementation of this process.

The honeycomb structure according to the invention makes it possible to obtain, for example, sheets in which the cells are perpendicular to the plane of the sheet, these sheets having a simple honeycomb structure or a sandwich structure with a honeycomb core.

It is already known to produce honeycomb structures made of thermally fusible material, which are essentially obtained by four processes.

The first process consists in adhesively bonding films to one another, with the aid of offset sheets of adhesive, and then in carrying out a drawing operation in order to obtain a honeycomb structure. This is a batch manufacturing technique, which is very expensive to implement.

A second process consists in thermoforming a sheet of thermoplastic. This is a batch manufacturing technique, the cells necessarily being tapered and the thickness of the structure obtained being very greatly limited.

Another process consists in injection moulding the structure inside a complex mould. In this case again, this is a batch technique, the size of the parts produced being limited.

A fourth process consists in extruding a thermoplastic profile of greater or lesser complexity, having cut-outs making cells. The cells are therefore oriented longitudinally in the extrusion direction. It is necessary, after extrusion, to cut the profile into slices, to reorient these slices at 90° with respect to the extrusion direction and to fasten the slices to each other, either by adhesive bonding or by thermal fusion, with or without added material, such as woven material, needle-punched material or a sheet of thermoplastic, in order to form a panel.

This technique is therefore complex to implement, as it requires off-line operations in order to end up with a final product consisting of a panel.

The honeycomb structures, such as those that have just been defined, possess very good intrinsic properties resulting, on the one hand, from the honeycomb structure and, on the other hand, from the nature of the thermally fusible material. These properties are, in particular, the mechanical strength in compression, a low weight, recyclability, thermoformability, a beneficial thermal insulation coefficient, their imputrescible character, as well as the permeability to most forms of radiation. These structures therefore find applications in many industries: automobile, naval, aeronautical and railway, as well as in buildings and public works, allowing the production of sandwich structures which advantageously replace cellular foams and elastomers of the rubber type, of conventional design.

Document DE 1,779,330 describes a process for manufacturing a crosslinked tubular net, in which strands of thermoplastic are extruded parallel to each other and are deflected in order to be brought into point contact in pairs due to the effect of hot-air pressure. This technique is not suitable for the production of a honeycomb cellular structure.

The object of the invention is to provide a process and a plant for manufacturing such a honeycomb structure, allowing continuous manufacture of a structure in the form of a panel, without requiring any off-line operations, this panel possibly consisting of a sandwich structure with a honeycomb core. Another object of the invention is to allow easy adjustment of the thickness of the structure obtained, during production, as well as of the density of this structure, with the possibility of varying the shape of the cells while the structure is being obtained.

For this purpose, the process to which the invention relates consists:

in continuously extruding, with the aid of a multislot die, parallel sheets of thermally fusible material inside a cooling chamber, with the creation of a seal between the longitudinal edges of the sheets and the walls of the chamber, the various sheets defining, among themselves and with the walls of the chamber, compartments;

in creating, in this chamber and from the end located on the die side, a vacuum in every other compartment so as to deform and attract, in pairs, the extruded sheets in order to carry out localized welding over their entire height;

in filling, from the end located on the die side, every other compartment, these alternating with the above compartments, with the aid of a coolant; and in alternating, in each compartment, the creation of a vacuum and the filling with the aid of a coolant in order to obtain a solidified honeycomb structure in the cooling chamber, in which structure the cells are perpendicular to the extrusion direction.

This technique is very beneficial insofar as the structure is output continuously, directly from the extrusion die, with cells that are perpendicular to the extrusion direction. It is therefore possible to output from the die honeycomb structures of very large dimensions, for example in the form of panels, which panels are obtained directly without any off-line operations.

The creation of a vacuum in the compartments defined by two sheets ensures that they come together and are welded over their entire height. Feeding the neighbouring compartments with thermally regulated coolant makes it possible, just after welding, to ensure that the structure solidifies in the cooling chamber.

One advantage over the technology of adhesively bonded or welded films is that, according to the invention, the welded part of the sheets may have approximately the same thickness as the non-welded part, thereby resulting in a reduction in the density of the structure, lightness being an important criterion. For this purpose, the process according to the invention consists in exerting on the structure leaving the cooling chamber a jerked pull so as to reduce the thickness of the sheets in those regions of the latter that have to be welded to each other.

It is possible to vary the shape of the cells, which may be in the form of regular or irregular polygons or have an elliptical, circular or oval shape, with the same die, during operation, by adjusting various parameters, such as the extrusion rate, as well as the alternating vacuum-coolant-feed cycles applied between two neighbouring sheets.

A plant for the implementation of this process comprises an extruder delivering the thermally fusible material in the viscous state to a coat-hanger die having several parallel slots each intended for the continuous formation of a sheet, each slot being defined by two cone-shaped pieces made of thermally insulating material and made in each of the cone-shaped pieces is a groove capable of being connected in succession to a vacuum source and to a coolant source, this plant also comprising a tubular cooling chamber, of rectangular cross section, having a height equal to the height of the structure to be obtained, in the direction of the cells of the latter, and having a width equal to that of the structure, a coolant tank from which the coolant is drawn off with the aid of a pump, a vacuum pump and a directional-control valve which, being linked to these two pumps as well as to a circuit connecting it to the various compartments located on both sides of the sheets, is intended to connect, in succession, each compartment with the vacuum source and with the coolant source.

In any case, the invention will be understood with the aid of the description which follows, with reference to the appended schematic drawing illustrating, by way of non-limiting example, one embodiment of a plant for the implementation of this process for manufacturing a honeycomb structure made of thermally fusible material:

FIG. 2 is a sectional view on a larger scale on the line II—II in FIG. 1;

FIGS. 5 and 6 are two views of the directional-control valve for simultaneously creating a vacuum in and supplying coolant to the various compartments located on each side of the sheets;

Figure 1:
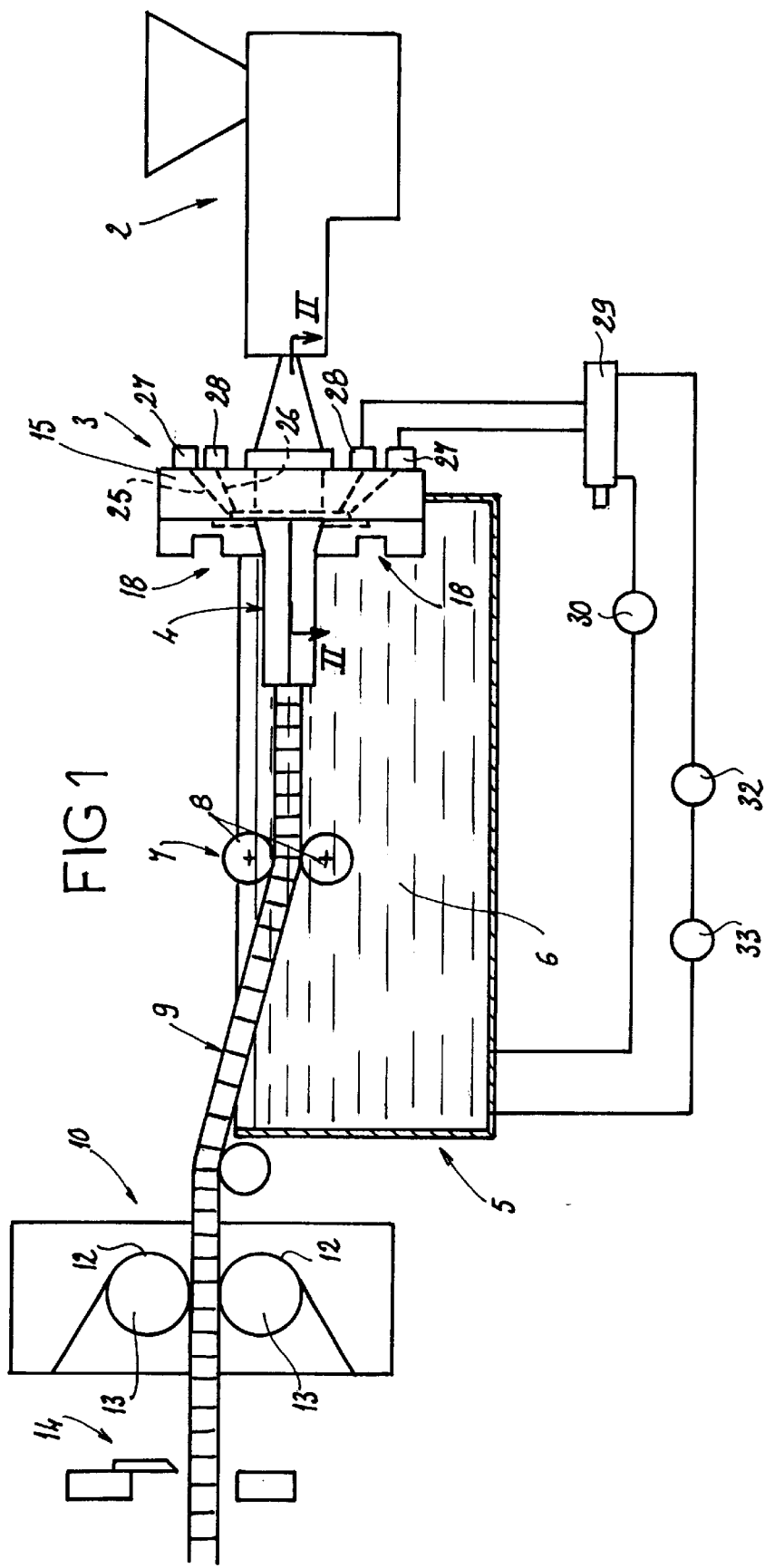
FIG. 1 is a general view of the plant.

FIG. 1 illustrates a plant comprising an extrusion device 2 allowing the delivery of a thermally fusible material, such as a thermoplastic of the polypropylene or rubber-elastomer type in a pasty state under pressure, distributing it over a great width, for example by means of a coat-hanger die 3. It goes without saying that the width of the die, as illustrated in the drawing and especially in FIG. 2 is restricted and serves simply to illustrate the process according to the invention, it being possible for the number of cells obtained to be much greater over the same width.

Located downstream of the die 3 is a chamber 4 for shaping and cooling the honeycomb structure, which chamber is pressurized. In the embodiment illustrated, this chamber is at least partially immersed in a tank 5 containing water 6. Located after the chamber 4 is a pulling unit 7 consisting of two rolls 8 driven in opposite directions and bearing on the two faces of the honeycomb structure 9. Located downstream of the tank 5 is a device 10 for the continuous welding of two covering sheets 12 paid out from two reels 13, so as to form skins on the two faces of the honeycomb structure 9. Finally, downstream of the device 10 is installed a cutting device 14 which cuts the honeycomb structure transversely to the extrusion direction so as to form slabs.

Figure 3:
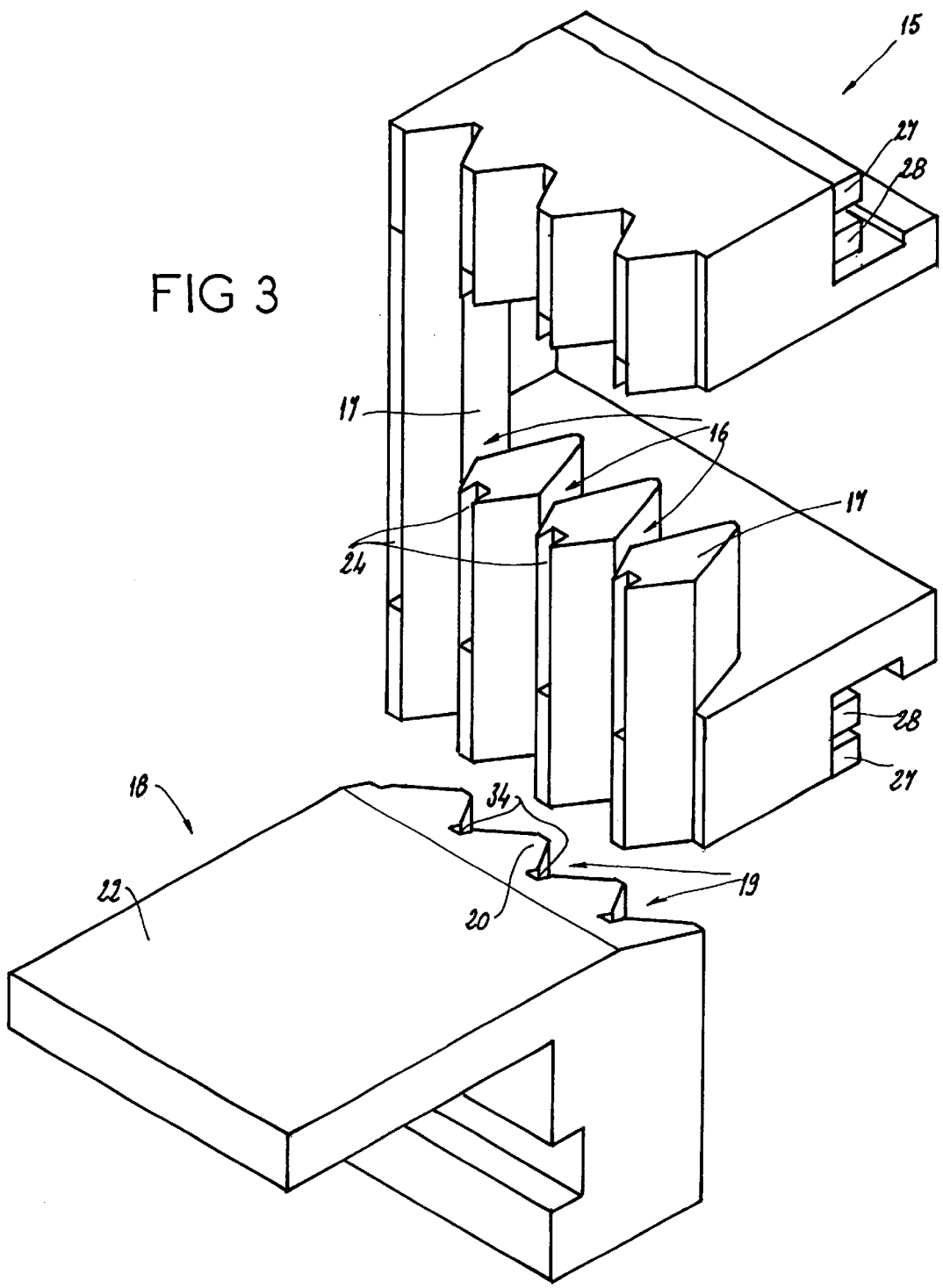
FIG. 3 is an exploded perspective view of the die and of the exit assembly for shaping the honeycomb structure.

The die 3 comprises a block 15 illustrated in greater detail in FIGS. 2 and 3. Made in the central part of this block 15, into which the material is delivered in a viscous state, are parallel vertical slots 16, each defined by two neighbouring cone-shaped pieces 17, the apex of which is facing upstream. These pieces 17 are made of thermally insulating material, having good mechanical properties, such as a polyimide, which is covered in the zone preceding the slots with a heat-transfer material, for example one based on gold, silver or copper. This heat-transfer device or each cone-shaped piece 17 could optionally be combined with heating means. This allows heat recovered upstream to be very rapidly delivered into the thermally fusible material, just at the point of shaping the latter so as to shorten the thermal gradient with respect to the cooling zone and to allow this thermally fusible material not to have reached its solidification temperature before it is shaped. Given the fact that the slots 16 are parallel, these slots will allow the formation of parallel sheets 31. It should be noted that the spacing between two neighbouring slots 16 corresponds to half the width of the cells of the honeycomb structure that will be formed. The honeycomb structure is shaped by means of two exit shaping assemblies 18, having conical parts 19 complementary to those 17 of the die, so as to allow imbrication of the latter parts and to ensure that the hydraulic circuit is sealed, whatever the vertical position of the parts 18 with respect to the die. This is because each part 18 is mounted so as to be vertically adjustable on the die 3, that is to say in the direction of the cells of the structure that has to be formed, so as to allow the thickness of the structure to be adjusted. The two assemblies 18 define, by their facing surfaces 20, 22, the bearing zones of the two faces of the honeycomb structure perpendicular to the cells.

Figure 7:
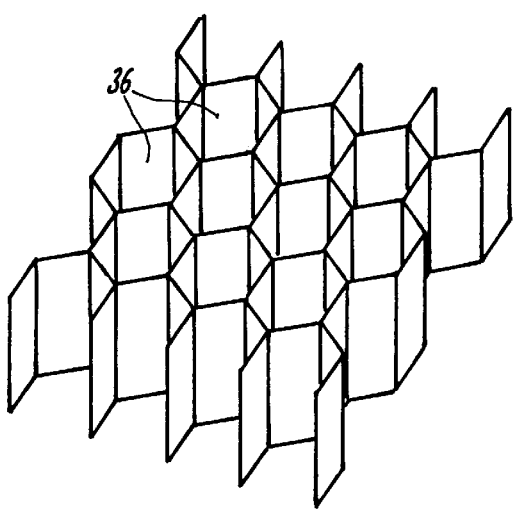
FIGS. 7 and 8 are two perspective views of two types of honeycomb structure that are capable of being obtained using the process according to the invention.

It should be noted that the surfaces 20 converge from the exit of the die towards the shaping and cooling chamber 4, the upper and lower walls of which consist of the surfaces 22 of the two exit assemblies 18. Insofar as one sheet has a height on exiting a slot 16 of 32 mm for example, the surfaces 22 are separated by 30 mm. The passage from 32 mm to 30 mm is made by means of the inclined surfaces 20. This makes it possible to benefit from excellent contact between the longitudinal edges of the sheets output by the die and the upper and lower walls of the chamber 22, creating a perfect seal between the compartments defined by the various sheets. This configuration makes it possible to obtain a simple honeycomb structure, as shown in FIG. 7.

Figure 4:
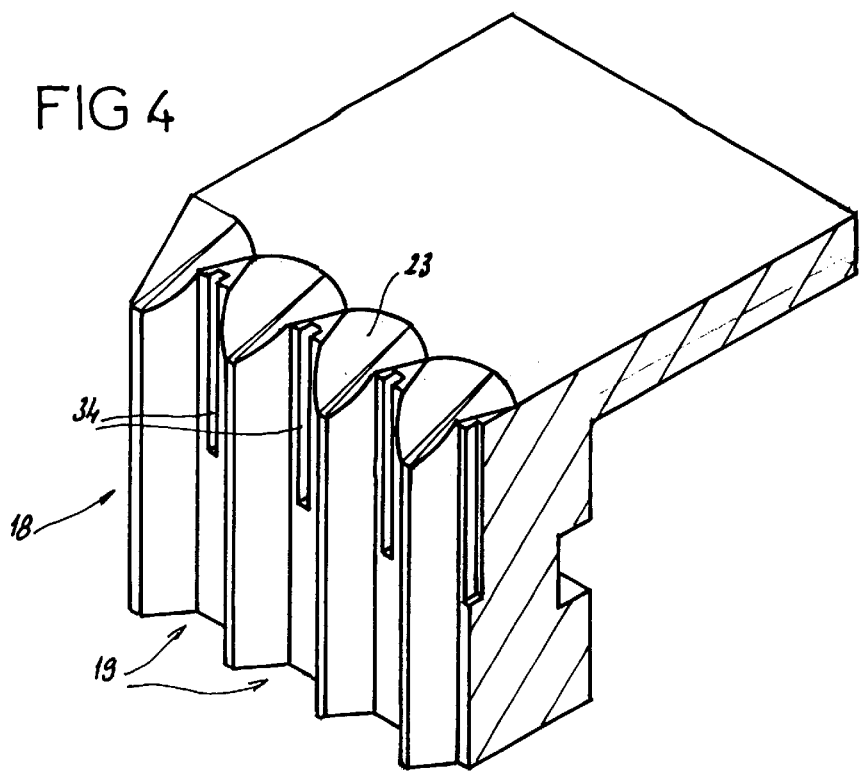
FIG. 4 is a perspective view of an alternative embodiment of the exit assembly for shaping the honeycomb structure.

In the embodiment illustrated in FIG. 4, the inclined surface 20 of each element 18 has a concave surface 23 facing the slot 16 for forming each sheet. It is thus possible to produce sheets with a substantially greater height than the separation between the two surfaces 22, causing the upper and lower edges to be folded over against the surfaces 22. In the conical parts 17, located on each side of a sheet leaving a slot 16, there are longitudinal grooves 24 which open downstream. Each groove is connected via two ducts 25 or 26 to a manifold 27 or 28, respectively. If a groove is connected via a duct 25 to a manifold 27, each neighbouring groove is connected via a duct 26 to a manifold 28. Each manifold 27, 28 may be connected in succession via a directional-control valve 29 to a vacuum pump 30 and to a coolant feed pump 32, this coolant consisting of the water 6 in the tank 5, which is thermoregulated by means of a device 33. It is therefore possible, depending on the position of the directional-control valve, and for a given groove 24, either to connect the latter to the vacuum pump 30, and thus create a vacuum between the two sheets defining the compartment into which this groove 24 opens, or to feed coolant into this groove 24 from the tank 5 via the pump 32.

The value of the coolant feed pressure corresponds approximately to the value of the pressure drops in the feed ducts and may be of the order of 1 bar (1 bar=$10^5$ Pa). The value of the vacuum may be as high as possible depending on the conditions under which the plant is used—altitude, temperature, etc., without however reaching the surface tension limit of the coolant. This vacuum may be about 0.6 bar.

FIGS. 5 and 6 illustrate, by way of example, a six-way directional-control valve in two positions.

In the position illustrated in FIG. 5, the manifolds 28 are connected to the vacuum source 30 and the manifolds 27 are connected to the pump 32 and fed with coolant. In FIG. 6, the reverse situation applies.

In order to limit the pressure drops, grooves 34 are made in the exit assembly 18, which interact with the grooves 24 in the main piece of the die in order to form channels large cross section which allow, in succession, the creation of a vacuum in and the introduction of coolant into the compartments defined by the sheets.

In practice, the vacuum exerted in a compartment between two sheets causes the two sheets to come together and to be welded, the coolant consisting of water ensuring that the material on one face of each sheet is cooled and that the structure solidifies in the cooling chamber. The reverse of the vacuum and coolant-feed phenomena in succession in the grooves 24 causes the cells to be formed and a structure as illustrated in FIG. 7 to be obtained.

The cooling chamber 4 is also bounded laterally by two walls 35, creating a seal at the two outermost extruded sheets.

The cooling chamber is therefore sealed and can be pressurized insofar as the water delivered by the grooves 24 cannot escape.

Figure 8:
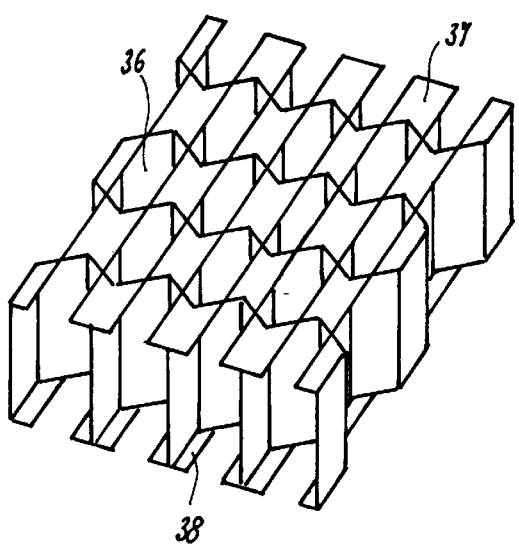

Since the shaping and cooling chamber 4 is pressurized with water, this water contained in the cells 36 depressurizes and feeds the tank 5 on leaving the chamber 4. Once the process is running, it is possible to dispense with the pulling unit 7. This is because since the pressure of the coolant, delivered by the manifolds 27 and 28 depending on the cycle, is less than the pressure of the thermally fusible material coming from the extruder, a reaction force in the sealed chamber 4 forces the honeycomb structure formed to leave it and, consequently, to provide the pulling at the exit from the die. The advantage is that this exit is jerked because of the reversal at each cell-forming cycle of the vacuum and of the coolant feed. As a result, the welded parts of the sheets are drawn more, and are therefore thinner, than the non-welded parts, which in turn results in a weight saving of the structure thus formed. It is possible to conjugate the characteristics of the low-speed pulling unit and of the coolant feed, greater than that which would be necessary, in order to produce cells of a particular shape, such as domed cells or cells 37 with a partial upper skin and a partial lower skin 38, as shown in FIG. 8, such a configuration being obtained with the exit assembly illustrated in FIG. 4. The structure illustrated in FIG. 8 is a structure with a honeycomb core and permeable skins.

The chamber 4 may be sealed by making the walls from a material having a good coefficient of friction, for example made of an elastomer foam.

The coolant may be at a temperature of about 30° C., for example in the case of polypropylene, thereby avoiding the phenomenon of quenching of the thermally fusible material on leaving the die, which would prevent it from deforming and being welded since it would be immediately frozen. In the process according to the invention, that face of the sheets on the vacuum side is not chilled sufficiently and is therefore able to be welded by contact and under the effect of very slight pressure against another sheet, because of the force exerted by the vacuum.

The degree of chilling provided by the coolant must be sufficient to finally solidify the structure in the cooling chamber.

With regard to the plant for the implementation of the process, it is possible to produce both the die and the exit and shaping assembly either by machining of solid pieces or by the juxtaposition of separate elements.

As is apparent from the foregoing, the invention affords a great improvement over the existing technique by providing a honeycomb-structure manufacturing process which is of simple design and allows a structure to be obtained continuously, in which the cells are oriented so as to be perpendicular to the extrusion direction, thereby permitting large slabs to be obtained which can be used directly, after having been cut up downstream, or which can be immediately coated with covering sheets forming skins.

As goes without saying, the invention is not limited to the single method of implementation of this process nor to the single embodiment of the plant which are described above by way of non-limiting example—on the contrary, it encompasses any variant thereof. Thus, in particular, the conical parts 17, 19 could be replaced with plane or semidome-shaped parts, the directional-control valve could be of a different type, for example a rotary one, or else the die having the slots could be dissociated from the coat-hanger die, without thereby departing from the scope of the invention.

What is claimed is:

1. A process for manufacturing a honeycomb structure made of a thermally fusible material, comprising:

continuously extruding, with the aid of a multislot die, parallel sheets of the thermally fusible material inside a cooling chamber, with the creation of a seal between longitudinal edges of the parallel sheets and walls of the chamber, the various sheets defining, among themselves and with the walls of the chamber, compartments;

creating, in the chamber and from an end located on a die side, a vacuum in every other compartment so as to deform and attract, in pairs the extruded sheets in order to carry out localized welding over their entire height;

filling, from the end located on the die side, every other compartment, these alternating with the above compartments, with a liquid coolant; and alternating, in each compartment, the creation of a vacuum and the filling with the liquid coolant in order to obtain a solidified honeycomb structure in the cooling chamber, the solidified honey comb structure having cells perpendicular to an extrusion direction.

2. The process according to claim 1, wherein the coolant is water whose temperature is regulated.

3. The process according to claim 1, wherein the thermally fusible material comprises a thermoplastic.

4. The process according to claim 1, wherein the parallel sheets are extruded in a cooling chamber which is pressurized because of the seal created between the longitudinal edges of the sheets and two first walls of the chamber and between the two external sheets and two second walls of the chamber.

5. The process according to claim 1, wherein the formed sheets have a height greater than that of the cooling chamber.

6. The process according to claim 1, further comprising;

exerting on the honeycomb structure leaving the cooling chamber a jerked pull so as to reduce the thickness of the sheets in those regions of the latter that have to be welded to each other.

7. The process according to claim 1, further comprising;

momentarily exerting a pressure of about 0.6 bar in each compartment.

8. A plant for manufacturing a honeycomb structure made of a thermally fusible material comprising:

an extruder delivering the thermally fusible material in a viscous state to a coat-hanger die having several parallel slots each intended for the continuous formation of a sheet, each slot being defined by two cone-shaped pieces made of a thermally insulating material, each of the cone-shaped pieces including a groove, the grooves being alternately connected to a vacuum source and to a liquid coolant source;

a tubular cooling chamber, of rectangular cross section, having a height equal to the height of the honeycomb structure to be obtained, in the direction of cells of the latter, and having a width equal to the of the structure; and a coolant tank from which a liquid coolant is drawn off with the aid of a first pump, a vacuum pump, and a directional-control valve, the directional control valve being linked to the first and vacuum pumps, as well as to a circuit connecting the directional control valve to various compartments located on both sides of sheets of the honeycomb structure, the directional-control calve intended to connect, in alternating succession, each compartment with the vacuum source and with the liquid coolant source.

9. The plant according to claim 8, wherein each cone-shaped piece, located on one side of a slot of the die, is coated with a heat-transfer material and/or equipped with heating means.

10. The plant according to claim 8, wherein the cooling chamber is at least partially immersed in a cooling tank containing water, through which the honeycomb structure passes on leaving the chamber, the water contained in the tank constituting the coolant which helps to shape and cool the sheets inside the chamber in order to form and solidify the cells.

11. The plant according to claim 8, wherein the die is associated with two exit assemblies having conical parts complementary to those of the die, into which the grooves open, successively creating a vacuum and feeding in coolant, the conical parts of the two assemblies fitting into those of the die, on either side of the slots for forming the sheets, the two exit assemblies defining, by their opposing faces, the two faces of the honeycomb structure perpendicular to the cells.

12. The plant according to claim 11, wherein that the two opposing faces of the two exit assemblies associated with the die converge from the exit of the die towards the cooling chamber.

13. The plant according to claim 11, wherein the opposing faces of the two exit assemblies have a concave surface facing the exit of each sheet.

14. The plant according to claim 11, wherein the two exit assemblies are mounted so as to be adjustable relative to the die, in the direction of the cells, so as to allow the thickness of the honeycomb structure to be adjusted.

15. The plant according to claim 8, further comprising;

a pulling device located downstream of the cooling chamber, the pulling device comprising two rolls driven in opposite directions and bearing on the two faces of the honeycomb structure perpendicular to the cells.

16. The plant according to claim 8, further comprising;

a first device, downstream of the cooling chamber, the first device for cutting the honeycomb structure, transversely to the extrusion direction, so as to form slabs.

17. The plant according to claim 8, further comprising;

a second device located downstream of the cooling chamber, a second device for continuously welding, to both faces of the honeycomb structure, two covering sheets forming skins.

* * * * *

UNITED STATES PATENT AND TRADEMARK OFFICE
CERTIFICATE OF CORRECTION

PATENT NO.   : 6,277,231 B1
DATED        : August 21, 2001
INVENTOR(S)  : Guy Ducruy It is certified that error appears in the above-identified patent and that said Letters Patent is hereby corrected as shown below:

Column 6,
Line 30, after "pairs" insert therefor -- , --

Column 7,
Line 7, after "equal to" delete "the" and insert therefor -- that --
Line 15, after "directional-control" delete "calve" and insert therefor -- valve --

Signed and Sealed this

Fifth Day of April, 2005

JON W. DUDAS
*Director of the United States Patent and Trademark Office*